H. W. SHONNARD.
AUTOMATIC STEERING DEVICE FOR TORPEDOES.
APPLICATION FILED FEB. 21, 1910.

1,030,134.

Patented June 18, 1912.

H. W. SHONNARD.
AUTOMATIC STEERING DEVICE FOR TORPEDOES.
APPLICATION FILED FEB. 21, 1910.

1,030,134.

Patented June 18, 1912.
6 SHEETS—SHEET 6.

WITNESSES:

INVENTOR

BY

ATTORNEY

UNITED STATES PATENT OFFICE.

HAROLD W. SHONNARD, OF EAST ORANGE, NEW JERSEY.

AUTOMATIC STEERING DEVICE FOR TORPEDOES.

1,030,134. Specification of Letters Patent. Patented June 18, 1912.

Application filed February 21, 1910. Serial No. 545,019.

*To all whom it may concern:*

Be it known that I, HAROLD W. SHONNARD, a citizen of the United States, residing in East Orange, county of Essex, State of New Jersey, have invented a certain new and useful Improvement in Automatic Steering Devices for Torpedoes, of which the following is a specification.

The present invention relates to a method and means applicable to that class of self steering, self propelling torpedoes intended to be launched against objects distant from four to five thousand yards, or over, from the point of launching and in which the gyroscopic effect of a fly-wheel supported on a horizontal axis in gimbal rings is used to control the rectilinear course of the torpedo.

As is well known to those skilled in the use of torpedoes of this class, the direction in the horizontal plane, taken by the torpedo, will be that direction to which the axis of said fly-wheel relates at the moment the fly-wheel is set free to exercise its gyroscopic influence upon the steering mechanism of the torpedo and the course, in the horizontal plane will be in said direction so long as the gyroscopic influence of the fly-wheel maintains said fly-wheel in its original plane of rotation with respect to the longitudinal axis of the torpedo.

In such well known torpedoes as the Bliss-Leavitt-Whitehead and Schwartzkopf, a gyroscopic wheel secured with reference to the longitudinal axis of the torpedo, is set in motion by internal motive means, upon the torpedo being released from its position of rest within the torpedo tube, and simultaneously with the starting of the propelling apparatus, and is subsequently released or set free to exercise its gyroscopic influence upon the steering mechanism of the torpedo. It is therefore apparent that, in these earlier devices, the time interval within which the wheel must attain its velocity and be released, is the time the torpedo remains within the directing influence of the launching tube after the ejecting impulse has been exerted within said tube. In practice this interval has been found to be of such short duration that very often the aforesaid releasing of said fly-wheel does not take place until after the torpedo is beyond the control of the sighted tube, resulting in a deflection from the intended course, before the directing influence of the gyroscope can be brought into play.

Another objection to the present method of spinning and releasing the gyroscope wheel during the aforesaid interval, is that the wheel has not time to acquire sufficient velocity to assure to it ample gyroscopic stability to hold the said wheel in its original plane of rotation, against such disturbing influence as vibration, heat and any grit, oil, etc., that may come in contact with a torpedo gyroscope in practice, which influences very often result in serious deflections from the intended course.

My invention relates to that class of automatically steered self-propelled torpedoes wherein the gyroscope and the internal propelling mechanism may move independently of each other, and it is an advantage of a preferred form of my invention that the energy for spinning the gyroscope is transmitted from outside of the launching tube, while the torpedo remains at rest within said tube.

It is an important object of the present invention to provide means whereby the gyroscopic wheel may be caused to attain any desired velocity prior to starting, and independently of the internal torpedo-propelling apparatus; preferably in conjunction with means for rigidly securing the gyroscopic wheel with definite relation to the longitudinal axis of the torpedo, and means for positively releasing said gyroscopic wheel during the interval between the first exertion of the torpedo ejecting impulse and the subsequent ejection of the torpedo from the tube, and while the torpedo is still within the directing influence of the tube.

The broad invention whereby the ends just mentioned are attained has the further advantage that it permits the use of a much larger and heavier gyroscopic wheel, thereby insuring a much longer period of efficient control on the part of this mechanism than is possible with the small wheels hitherto necessarily employed.

Still another object of the invention is to provide means whereby the tripping or discharging mechanism of the launching tube will indirectly bring about the release of the already rotating gyroscopic fly-wheel, setting it free to exercise its gyroscopic influence upon the steering mechanism of the torpedo, while the torpedo is still within the directing influence of the launching tube, thereby avoiding possibility of accidental deflection before the gyroscope comes into play.

One advantage of my invention is that it lends itself to various modes of operation according to the particular case in hand. My method and apparatus are particularly adapted to and intended for application to torpedoes designed to reach the utmost maximum of speed and effective radius. Its capacity to use a much heavier and a more rapidly spinning independent gyroscope than heretofore made possible contributes largely to this desirable end, but the independence of the spinning and unlocking functions on the one hand and the launching function on the other hand is equally valuable.

It is obvious that, in discharging a torpedo at a very distant mark, and particularly a moving mark, it is very important that the spinning gyroscope should be unlocked at the precise instant when the torpedo is properly pointed. If an appreciable time elapses between the moment when the torpedo passes beyond control and the moment when the gyroscope is spun and unlocked, there is introduced a very large error, due to rolling of the vessel etc., which can only be guessed at. This source of error, which is found in prior torpedoes of this general class, I have entirely done away with by my present invention.

By use of my apparatus, an indefinite time is available for bringing the gyroscope up to speed, after which the unlocking can be accomplished by a swift short movement occurring at the precise instant when the torpedo is properly pointed. The ejection of the torpedo can then take place at the leisure of the operator, since, even if a considerable deflection of the tube and torpedo takes place after the unlocking, the torpedo, once launched will return infallibly to paralellism with the direction given it at the moment when its gyroscope was unlocked.

Another novel feature of the invention is that the steering engine controlling valve, which is operated by the gyroscope, is independent of the steering engine cylinder, which makes it possible to locate the steering cylinders in any convenient position in close proximity to the rudders of the torpedo, and the particular advantage of this arrangement is the elimination of the long reciprocating rudder rods and the weight thereof, necessary when the steering cylinder or its mechanical equivalent forms a component part of the gyroscope as in the Bliss-Leavitt, Whitehead and Schwartzkopf torpedoes. In its preferred form, this feature of my invention also provides for relieving the primary valve (controlled directly by the gyroscope) from the disturbing influence of the large quantity of exhaust fluid direct from the engine operating the rudder.

Another important feature of my invention is the provision of means whereby the mechanism associated with the gyroscope for "angle-fire" adjustment may be operated without encountering difficulties incident to lost motion in the parts thereof; thereby greatly increasing the accuracy of aim in "angle-fire" work.

Certain other objects and advantages of my present invention will fully appear in connection with the following description.

My invention is illustrated in a preferred form in the accompanying drawings, wherein—

Fig. 5 is a cross section of a torpedo showing so much of its interior equipment as relates to my invention, Figs. 5ª, 6, 7 and 8 are details of parts shown in Fig. 5.

The broad method of operation which is involved in my invention has to do with a special order of operations which permits the storage of a much greater amount of energy in the gyroscope-wheel than has been possible in connection with former methods of operation, both by admitting the use of a heavier wheel and of a higher velocity of rotation thereof. This I accomplish by setting up the desired rotation, or "spinning" the wheel before the torpedo ejecting impulse is applied, and releasing the gyroscope at any time before the torpedo gets beyond the directing influence of the launching tube, which may be before admitting the ejecting impulse, at the same time, or afterward. The adoption of this course gives an indefinitely extended period of time during which the spinning effort is exerted, and therefore the amount of energy stored in the gyroscope-wheel is practically not limited, as heretofore, by time considerations. It follows that the effective directive control of the gyroscope is thus very greatly extended. A variety of mechanical devices may be resorted to in carrying out this method of operation and it is to be understood that my invention covers broadly the method itself as above set forth, whatever mechanical construction is employed in carrying out the same. The particular means hereinafter described is merely one illustrative construction appropriate to the above named ends.

Figure 1:
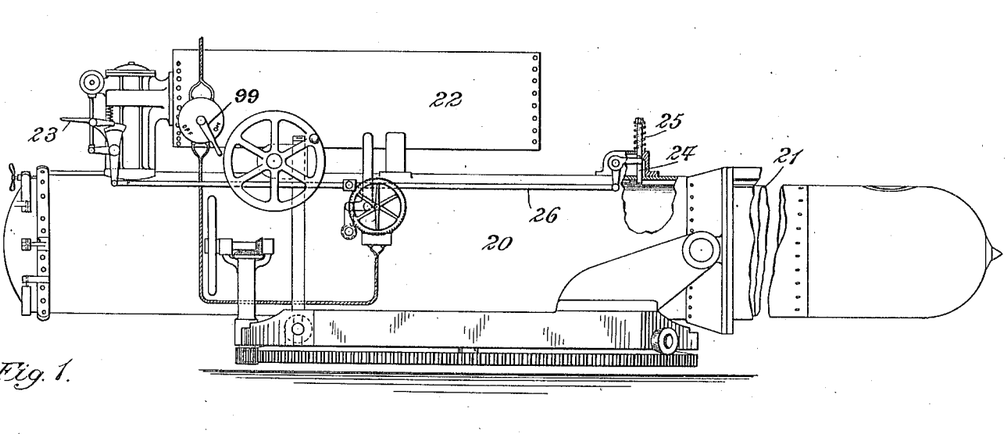
Figure 1 is a side view of a launching tube with torpedo in place.
Figure 2:
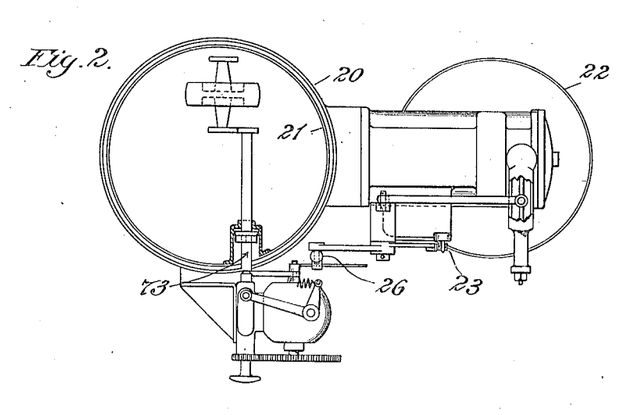
Fig. 2 is an end view of the same on a larger scale, the breech being removed and a portion of the interior mechanism being shown in diagram.
Figures 5, 5A, 6, 7, 8:
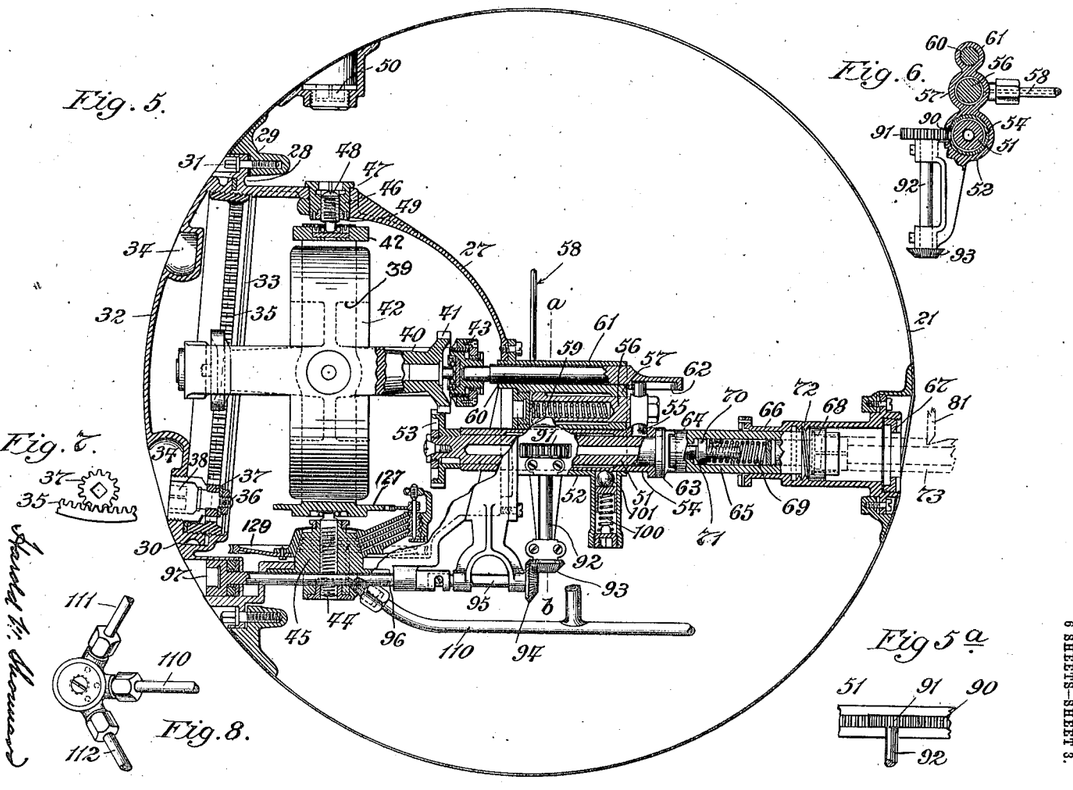

In the accompanying drawings I have shown a preferred form of the improved means which I have devised, wherein the general organization exemplified in Figs. 1, 2 and 5 is employed.

The launching tube is shown at 20, with the torpedo 21 shown in place ready to be fired. At 22 is shown the reservoir for the air used in ejecting the torpedo, which air is liberated in the usual manner by a firing latch 23. At 24 is shown the usual releasing pin operated by a spring, as 25, and controlled by the usual tripping bar 26 which is in turn controlled by the firing latch 23 as shown. I prefer to employ this bar 26 to release the spinning mechanism as hereinafter described, but it is to be understood that my invention is not limited to any particular means by which the spinning device is released.

Within the torpedo shell 21 is secured a gyroscope chamber 27 having a seating ring 28, preferably integral therewith, which ring is secured to the frame 29 of an appropriate aperture 30 in the shell, by means of bolts 31 or otherwise. The external closing means for this chamber may be of any appropriate construction, but I prefer to employ the device shown, wherein a door proper 32, having an internal left hand thread within its inner edge is provided with a joining ring 33 having both left and right hand threads, the former fitting the door as shown, and the latter being adapted to fit a corresponding female thread in the seating ring 28.

The door proper has appropriate cavities 34, whereby it may be conveniently manipulated, and, when the joining ring has been screwed into said door, the two elements can be applied to close the opening 30 in the following manner: The door 32 and ring 33 are first applied together to the seating ring and screwed down by means of the right hand threads in the ring 33 and seating ring 28 by rotating the door. Owing to the cylindrical shape of the torpedo, it is obvious that the door 32 will only register accurately with the opening provided for it in one position. It follows, therefore, that the final turns necessary for forcing the door firmly home to produce a water-tight closure cannot be given to the door after it has assumed the proper position for registering with the opening 30. My invention therefore includes means, capable of operation from outside of the torpedo for drawing the door inward to its seat without turning it, and while it is so placed as to register with the opening. While my invention covers any means for this purpose, I prefer the following: The joining ring 33 is internally geared, as shown at 35, and the door 32 is provided with a short shaft 36, carrying a pinion 37, meshing with the teeth 35. The shaft 36 has a square cavity 38, into which a tool may be fitted to turn the shaft and pinion. The door can then be drawn inward by holding it in registry with its opening by means of the cavities 34, while the shaft 36 is revolved. This turns the ring 33, which then acts in a well known manner to draw the door down upon its seat.

Figure 11:
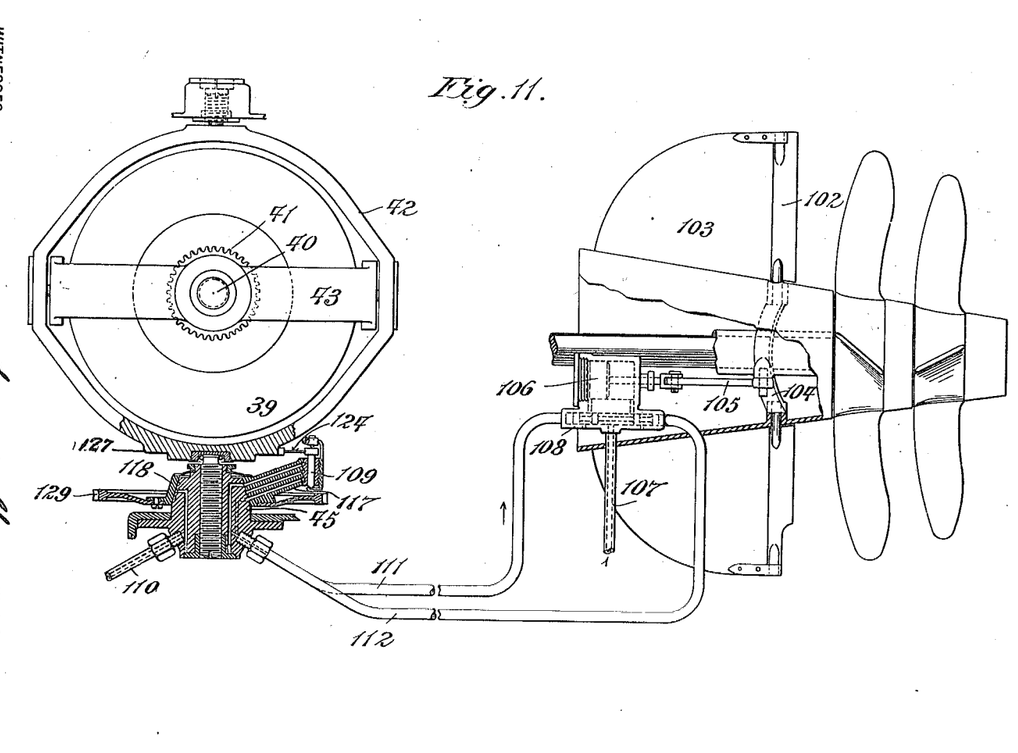
Fig. 11 is a diagrammatic view of one form of automatic steering means.
Figure 12:
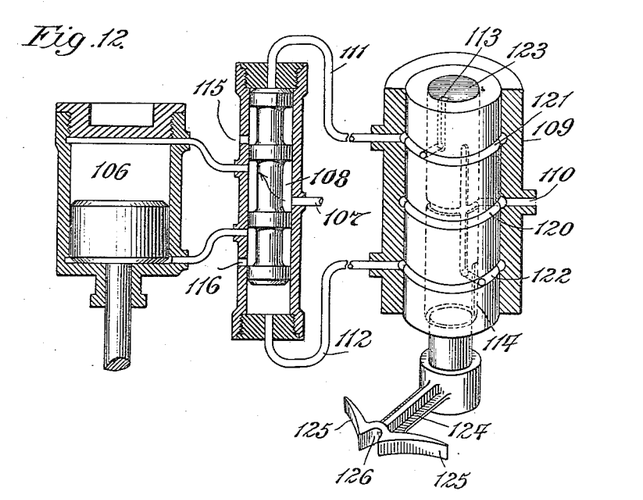
Fig. 12 is a diagrammatic view of a preferred arrangement of valves and cylinder used when fluid control is employed for steering.
Figure 13:
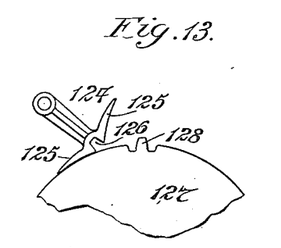
Figs. 13, 14 and 15 are diagrams illustrating the relation of the controlling disk on the gyroscope to the movable arm on the governing device for automatic steering.
Figure 14:
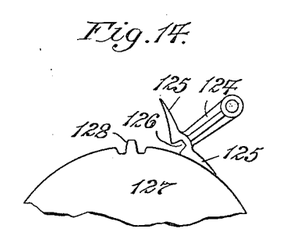

Within the chamber 27 is mounted the gyroscope (which term includes the wheel and its gimbals.) The wheel is shown at 39, and its shaft 40 carries a pinion 41. The vertical gimbal is shown at 42 and the horizontal gimbal at 43. (Figs. 5 and 11).

The lower mounting of the gyroscope is an adjusting screw 44 in a conical support 45, and the upper mounting comprises preferably a threaded sleeve 46, having a shoulder 47, and carrying a bearing screw 48 which can be accurately adjusted once for all while the shoulder 47 is screwed home as shown, and may then be secured by the lock nut 49. Both bearings for the gyroscope are carried by the walls of the chamber 27.

Opposite the upper bearing I provide an inset opening in the shell, closed hermetically by the cap 50. Through this a tool may be introduced whereby the sleeve 46 may be unscrewed sufficiently to release the gyroscope when it is desired to remove it through the opening 30. The gyroscope may thus be removed without its supports, and can be replaced conveniently with perfect adjustment by simply screwing the sleeve 46 down so that its shoulder 47 comes firmly down on its bearing.

My present invention broadly considered is not limited to any special location of the prime mover whereby the spinning of the gyroscope is accomplished, whether within the torpedo body or out of it. I prefer, however, to transmit the spinning energy from outside of the launching tube, as shown in the drawings, and the particular arrangement shown involves the use of an internal spinning connection adapted to be engaged by the exteral spinning device.

The internal spinning connection preferably takes the form of a shaft, as 51, movable longitudinally in a slideway 52 and projecting at one end into the gyroscope chamber, where it is provided with a gear 53, adapted to be moved into mesh with the gear 41 on the shaft of the gyroscope-wheel. The shaft 51 passes through and turns in a stationary sleeve 54 which slides back and forth on the slideway 52, with the shaft 51. This sleeve is engaged by the end of a pin 55 attached to the end of a piston 56 sliding in a cylinder 57 to which compressed air may be admitted, as by the pipe 58 (see Fig. 6.) A spring is shown at 59, which may or may not be used to supplement the action of the compressed air.

A centering pin 60, slides in an appropriate guideway 61, projecting into the chamber 27 and into an appropriate cavity in the horizontal gimbal 43, as shown in Fig. 5. The rear end of the centering pin is provided with a channel 62, which receives one end of the pin 55, the arrangement being such that the pin 55 causes the centering pin to move to the right to release the gyroscope when the piston 56 moves outward, this movement having first resulted in disengagement of the gears 41 and 53, by sliding of the shaft 51.

The relation of the centering pin and motive piston 56 to the spinning shaft 51 is clearly shown in Fig. 6, which is a sectional view on the line a—b in Fig. 5.

In my preferred embodiment shown, the revolving of the spinning shaft is accomplished through the medium of what may be called a "spinning plug". Where this construction is adopted, to rear end of the shaft 51 preferably carries a clutch member 63, adapted to be engaged in a well known manner by a corresponding clutch member 64 on the end of the spinning plug 65, which is adapted to slide within a socket 66 extending inward from an opening in the shell 21 of the torpedo. At this opening is placed a seating ring 67, against which the head 68 of the spinning plug is forced when the shaft 51 moves to the right in Fig. 5 under the influence of the piston 56 and pin 55.

In order to insure a permanent pressure of the head 68 on its seating ring for exclusion of dirt, grit and sand, I prefer to make the plug 65 hollow as shown, and to place within it a spring 69 and plunger 70. A pin 71 projects from the end of the shaft 51 into the plug 65 and against the plunger 70. Thus, when pressed to the right in Fig. 5 by the pin 55, the shaft 51 will exert elastic pressure upon the plug to insure a fit at the seat, 67.

The exclusion of water from the body of the torpedo is accomplished by the fit of the plug body proper within the socket 66.

The plug 65 is provided with a short screw thread 72 which may be made to engage a corresponding thread in the socket 66, to hold all the parts in the position shown. Other temporary locking means for the plug are within my invention.

Figures 3, 4:
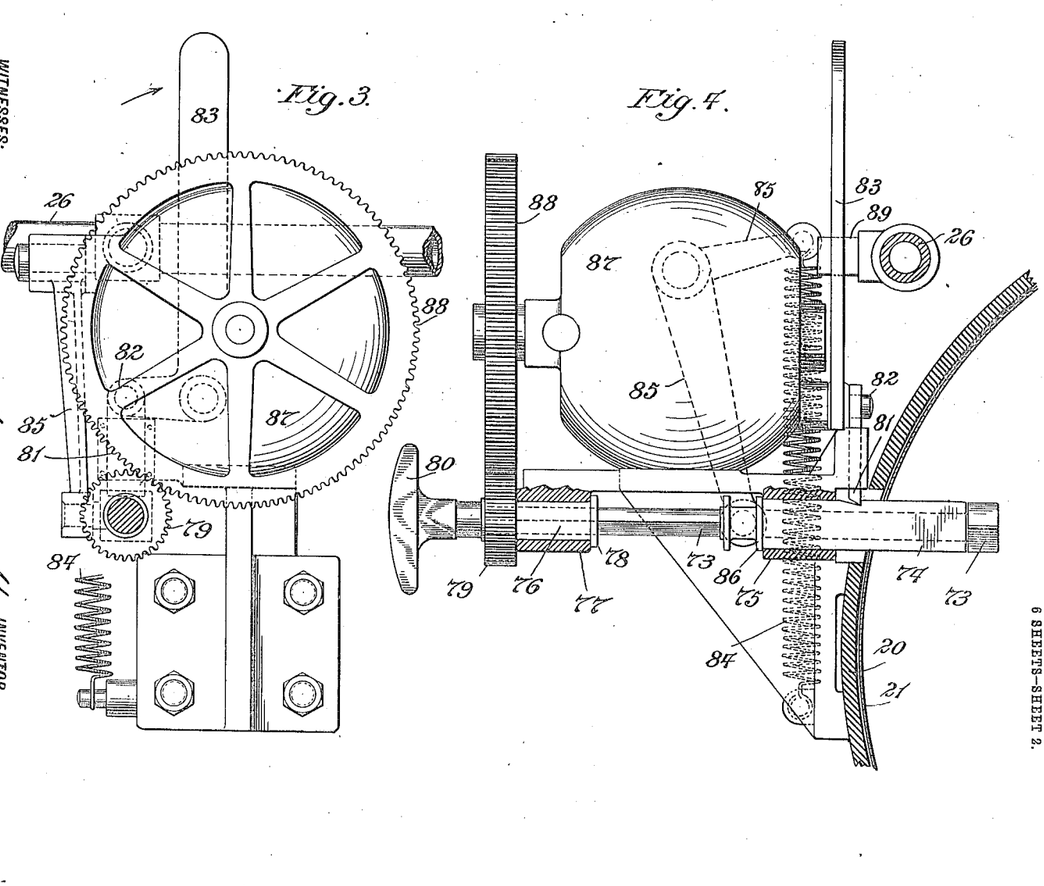
Fig. 3 is an elevation of the exterior spinning device with a motor.
Fig. 4 is an elevation of the same viewed at right angles to Fig. 3.

Any appropriate means may be employed for imparting a rotary motion to the spinning shaft 51 through the plug 65, without departing from my invention, and such means may or may not include a motor or other spinning prime mover for developing the energy of rotation. In the preferred form shown, which includes such a motor, the construction is as follows: The end of the plug 65 is provided with a squared cavity to receive the square end of a removable spindle shown in dotted lines in Fig. 5 at 73. It is shown in full lines in Figs. 2 and 4. This spindle may be called the external spinning connection or shaft. It has a round portion which turns within the square sleeve 74 sliding in the guideway 75. (See Fig. 4.) Behind this rounded portion, the external spinning shaft 73 is squared and slides through a sleeve 76, squared internally to fit the shaft 73, but cylindrical externally so as to rotate within a bearing 77. This sleeve carries a shoulder 78 and a pinion 79, which prevent longitudinal movement thereof within the bearing 77. The outer end of the shaft 73 carries a handle 80, whereby it may be pressed inward, together with the sleeve 74, to occupy the position shown in Fig. 4. Here the whole is locked by the plate 81, pivoted at 82 to a bell-crank lever whose longer arm 83 preferably stands upright as shown. On tilting the arm 83 in the direction of the arrow in Fig. 3, the plate 81 will be lifted, releasing the external spinning shaft 73 and the sleeve 74. When this occurs the shaft is instantly withdrawn from the torpedo and tube by the spring 84, acting through the bell-crank 85, one arm of which engages in a well known manner with the socket 86 attached to the sleeve 74.

In the preferred form shown the shaft 73 may be spun by the electric motor 87 which drives the gear wheel 88 meshing with the pinion 79. The whole apparatus is preferably attached directly to the exterior of the tube 20, so that the tripping bar 26 (which may be a hollow pipe as shown) passes close to the arm 83. A tripping pin 89 is carried by the bar 26, so that, when said bar is normally actuated, said pin strikes the arm 83 and lifts the locking plate 81 to release the spinning shaft 73.

A variety of means may be employed for properly adjusting and operating the spinning connections so far described without departing from my invention, and as an illustrative example of these I have shown in the drawings the preferred construction next to be described.

As shown in Fig. 5ª, the internal spinning shaft 51 is provided with a sleeve 54 carrying a rack 90, which is permanently in mesh with the pinion 91 on the short vertical shaft 92 (see Fig. 5). At the opposite extremity of this shaft, the bevel gear 93 engages a similar gear 94 at one end of a shaft 95. The opposite end of this shaft is engaged by suitable means, substantially as shown, on the end of a second shaft 96, whereby revolution of the shaft 96 in one direction will be transmitted to the shaft 95, while movement of this latter in the opposite direction may take place independently of any movement of the shaft 96. The shaft 96 projects to the exterior of the torpedo body through a suitable packing, and is provided with a head having a square cavity 97, or with equivalent means whereby a tool or key may be applied for revolving said shaft.

The mode of operating the parts so far described is as follows: The door 32 being removed, the gyroscope may be accurately centered by the hand of the operator reaching in through the opening 30 (see Fig. 9 where the gyroscope-wheel is shown in part). Holding the gyroscope centered with one hand, the operator revolves the shaft 96 with a tool in the other hand, thus turning the pinion 91 and drawing the spinning shaft 51 with the piston 56 and pin 55 toward the gyroscope. The pin 55 finally pushes the centering pin to the left in Fig. 5 until it enters the appropriate cavity in the gimbal ring 43. At this time the pinion 53 is in mesh with the pinion 41 and in the same plane therewith, being situated a little to the right of its position in Fig. 5. With the parts so placed, an operator on the opposite side of the torpedo applies a suitable square ended tool to the square cavity in the head 68 of the spinning plug 65, and pushes the same inward until it strikes the end of the shaft 51. By feeling and slightly turning this way and that, the clutch members 63, 64 are easily made to engage, after which the spinning plug (and with it the shaft 51 and the gyroscope-wheel) is turned about one turn or a little more, until the thread 72 has been screwed home. This draws the plug 65 to the left in Fig. 5, and with it the shaft 51 and centering pin 60, until they assume the position shown in Fig. 5. The parts being in this position, the cover 32 is applied, and, the torpedo being first placed in the tube 20, the external spinning shaft 73 is pushed inward until its squared end enters the square cavity in the head 68 of the plug 65. As shown in dotted lines in Fig. 5, this squared end does not touch the bottom of the cavity, but enough room is left to permit such movement of the shaft 51 and plug 65 to the right as will return the pinion 53 into the same plane as the pinion 41. In this position the external spinning shaft is locked by the plate 81, as heretofore described. The apparatus is now ready for spinning the gyroscope-wheel and then firing the torpedo. It is obvious that any desired interval of time may elapse between the first movement of the gyroscope-wheel and its release, or between either of these operations and the discharge of the torpedo from the tube. In the form of apparatus shown as an illustrative example in the drawings these operations are accomplished as follows: The parts being as shown in Figs. 1, 2, 4 and 5, the electric motor 87 is set in motion by means of the switch 99, and the spinning shafts and plug are revolved rapidly in such a direction as to unscrew the thread 72 in the plug 65, or to release such other temporary locking means as may be used. Hereupon the spinning shaft 51 and plug 65 are free to move slightly to the right in Fig. 5, being impelled by the spring or air or both behind the piston 56. This brings the pinion 53 into the plane of the pinion 41 and also brings the bottom of the cavity in the head 68 down against the end of the external spinning shaft 73; after which further movement is prevented by the locking plate 81. Rotation of the motor 87, and consequent spinning of the gyroscope-wheel 39 is continued as long as may be desired, and at any time after proper speed has been imparted, the wheel 39 may be released and the torpedo be launched. In the form shown the firing and release are preferably accomplished by a single movement. The usual firing latch 23 being struck in a well known manner to admit the expelling air from the reservoir 22, the tripping bar 26 and retaining pin 24 are released, and in their movement they release the lock 81 in the manner heretofore described. At once the spring 84 withdraws the spinning shaft 73 from the torpedo and tube, and the piston 56 within the torpedo pushes the shaft 51 and plug 65 to the right in Fig. 5 until the opening at 67 is tightly closed, while both the pinion 53 and the centering pin 60 are withdrawn from engagement with the gyroscope, which is thus left free to exert its controlling effect before the torpedo leaves the directing influence of the launching tube 20. This releasing movement revolves the pinion 91 backward, but this turning is accomplished freely and without affecting the shaft 96, as heretofore described. The spring 100 and ball 101 act in a well known manner to steady the spinning shaft 51 and sleeve 54 in their extreme positions, and prevent slipping due to any rolling movement of the torpedo, which might occur if the air control exerted through the piston 56 were to fail. For this purpose the ball 101 engages properly placed depressions in the sleeve 54.

My invention is not limited to a construction wherein the release of the gyroscope is accomplished by means dependent for operation on movement of the firing means; and in those of my claims in which such dependence is specified I do not limit myself to the use of a firing latch or tripping rod or both.

The operations so far described suffice where the torpedo is intended to take a direct course after leaving the tube. My invention covers further details, however, whereby it may be applied to "angle fire." These are preferably associated with certain other improvements in the steering apparatus whereby the weight of the moving parts is lessened. These improvements which are best shown in Figs. 9 to 15, are claimed herein independently of a means for "angle-fire." In this connection my invention preferably comprises a rudder actuated by some form of engine placed near it, which engine is governed by a governing device placed near to and controlled by the gyroscope. The transmitting means whereby the governing device governs movement of the engine will be of a character appropriate to the nature of the engine used, and will be themselves stationary. These means may take the form of pipes where (as in the form shown) a fluid-pressure engine actuates the rudder from a point near it.

In the drawings the rudder is shown at 102 pivoted in a well known manner to a fin 103 or other proper support. It is moved by a curved arm 104, connected to a connecting rod 105 from the compressed air engine 106. It will be understood that this engine and its governing device are actuated by pressure of air supplied from an air flask and proper pressure reducing means, both of which are so well known in this connection as to require no illustration here.

In Fig. 11 the high pressure pipe which supplies air to the engine is shown at 107. Figs. 12 to 15 are diagrammatic in character and show the relations of the parts. The details of construction and mode of operation of these parts, taken separately are well known.

The fluid is supplied through the pipe 107 to the secondary valve 108, whereby it is directed to one side or the other for proper operation of the engine.

The preferred governing device shown is a primary valve 109, supplied preferably with air through the pipe 110, which is directed through one or the other of the pipes 111 or 112 to opposite ends of the secondary valve 108 to govern it. These pipes extend from near the gyroscope to the engine near the rudder. Exhaust openings 113 and 114 are shown in the valve 109 in Fig. 12 through which the small quantities of air needed for operating the valve 108 are exhausted as the latter valve is reversed. The larger quantity of air which moves the engine is exhausted directly, by short passages, into the body of the torpedo, through the openings 115 and 116. It is one advantage of my present improvement that, instead of admitting large quantities of exhaust air directly from the engine to the primary valve as has been done hitherto, I only subject the primary valve to small quantities of air from the secondary valve. This makes the primary valve much more delicate and reliable in action. In adapting this construction to my novel angle fire device, I prefer to mount the primary valve (or equivalent governing device) upon an arm 117 on a support 118 revolubly mounted on a preferably conical mounting 45 placed concentrically with respect to the prolongation of the axis of the vertical gimbal of the gyroscope and upon which the gyroscope is preferably mounted.

In order to properly convey the air from pipes 110, 111 and 112 to and from the primary valve 109 I prefer to provide circular grooves as shown on the conical surface of the mounting 45, which grooves communicate permanently with said pipes by interior passages. Suitable passages are provided within the arm 117 which register with said grooves and with corresponding grooves 120, 121 and 122 in the primary valve (see Fig. 12) through which air is diverted in a well known manner by movements of the inner core 123 of the primary valve. This inner core, whose movements determine the operation of the primary valve, is rotated one way or the other by means of the arm 124, preferably provided with curved wings 125, separated by a notch 126, and having their concave surfaces adapted to fit the periphery of a disk 127 controlled, and preferably carried by, the vertical gimbal of the gyroscope. This disk is provided with a tooth 128, which occupies the notch 126, when the valve 109 is at or very near its desired middle position (see Fig. 15). When the valve 109 and disk 127 on the gyroscope revolve with relation to each other, the arm 124 is swung and turns the inner core 123 of the valve 109 one way or the other, thus operating the secondary valve to direct the engine 106 so as to move the rudder in a manner to return the tooth 128 (held fixed in special direction by the gyroscope) to the notch 126, which swings with swinging of the torpedo. When the tooth 128 is out of the notch, the arm 124 is held steady by the wings bearing against the periphery of the disk 127.

Figure 15:
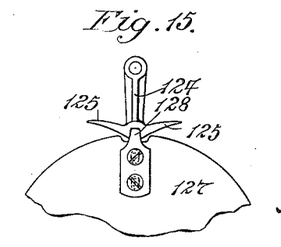

In order to permit of adjustment for more perfect engagement of the tooth 128 and notch 126, I prefer to mount the former movably upon the disk 127 in a manner to permit radial adjustment (see Fig. 15).

It is obvious that, by suitable placing of the primary valve before discharge of the torpedo, the rudder 102 may be set hard over in either direction, to cause the torpedo to take a course at any desired reasonable angle with the line of original discharge.

It is one important advantage of my present improvement that I employ a movable governing device in combination with actuating means therefor fixed once for all upon the gyroscope. By this means I can employ setting means which remain in permanent engagement with the movable governing device, thus avoiding the serious difficulties due to unavoidable lost motion in setting means which have to be engaged and disengaged from the parts to be adjusted.

Figures 9, 10:
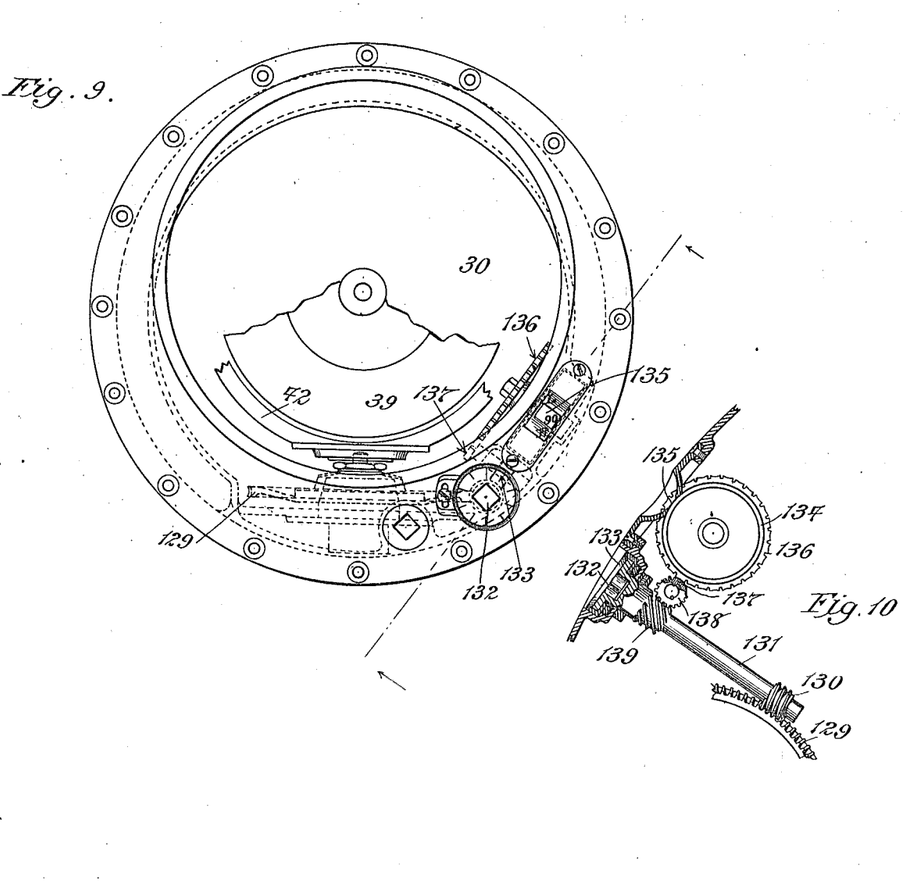
Fig. 9 is a front view of the gyroscope doorway shown open.
Fig. 10 is a sectional view showing the indicator for angle fire adjustment.

The setting means preferably employed are shown in Figs. 9, 10 and 11. These comprise a worm wheel 129 fixed to the support 118 carrying the primary valve, and a worm 130 closely engaging said wheel so as to preclude lost motion or back lash. The worm 130 is carried on a shaft 131 projecting without the torpedo shell and provided with a square cavity 132 in its head whereby a tool may be employed to revolve it. The head of the shaft 131 is extended in a disk 133 which is graduated as shown in Fig. 9 so as to indicate fractions of a turn of said shaft corresponding to the degree of revolution of the wheel 129. By this means very accurate angle-fire adjustments may be made.

In order to easily count the number of revolutions of the shaft 131 I employ a counter cylinder 134 whose periphery closes an inspection opening 135 in the torpedo shell, said cylinder being properly numbered, as indicated in Fig. 9. The numbers run from zero upward in one direction at one side of the visible rim of the cylinder 134 and from zero upward in the opposite direction on the other side of the visible rim. By this means revolutions of the wheel 129 in either direction from zero may be measured, and no mistake can be made as to the direction, the torpedo will take on the angle fire.

The cylinder 134 is provided with a gear 136 driven by a pinion 137 which is turned by the spiral toothed pinion 138 meshing with the similar pinion 139 on the shaft 131.

What I claim is—

1. A submarine torpedo body, propelling and steering mechanism therefor within the same, a launching tube, and ejecting means associated with said tube, in combination with a gyroscope within the torpedo body, movable independently of the propelling mechanism, for controlling said steering mechanism, and means for conveying and controlling energy from outside of the launching tube for spinning said gyroscope, substantially as described.

2. A submarine torpedo body, propelling and steering mechanism therefor within the same, a launching tube, ejecting means associated with said tube, and a controlling device for said ejecting means; in combination with a gyroscope within the torpedo body movable independently of the propelling mechanism for controlling said steering mechanism, means for spinning said gyroscope, and a second controlling device, capable of operation independently of operation of said ejecting means, for governing the action of said gyroscope-spinning means, substantially as described.

3. A submarine torpedo body, a gyroscope within the same, automatic steering mechanism associated with said gyroscope, propelling means within said torpedo body independent of said gyroscope; in combination with a launching tube, means for launching the torpedo from said tube, spinning means for said gyroscope, means for energizing said spinning means, a controlling device for said launching means, and a second controlling device, capable of operation independently of operation of said launching means, for governing the action of the energizing means of the gyroscope, substantially as described.

4. In combination with a torpedo body, propelling mechanism within said body, a gyroscope independent of said propelling mechanism within said body, and automatic steering mechanism associated with said gyroscope; a launching tube, a prime mover outside of said launching tube, and connecting means between said prime mover and said gyroscope for spinning the latter, substantially as described.

5. A torpedo body, propelling mechanism within said body, a gyroscope independent of said propelling mechanism within said body, and automatic steering mechanism associated with said gyroscope; in combination with a launching tube, ejecting means associated therewith, a controlling device for said ejecting means, spinning means for said gyroscope, locking means for holding the gyroscope while being spun, means for releasing the gyroscope from said locking means, and a second controlling device independent of said ejecting means, for controlling operation of said releasing means, substantially as described.

6. Apparatus for determining and controlling the direction of movement of a self-propelled submarine torpedo comprising in combination steering means, a gyroscope within the torpedo body adapted to govern said steering means, a launching tube for the torpedo, rotary spinning means outside of said launching tube and means for transmitting the energy of said spinning means to said gyroscope for spinning the same while the torpedo is in said tube, substantially as described.

7. Apparatus for determining and controlling the direction of movement of a self-propelled submarine torpedo comprising in combination steering means, a gyroscope within the torpedo body adapted to govern said steering means, a launching tube for the torpedo, a source of energy outside of said launching tube and means for transmitting and applying said energy directly and continuously to said gyroscope for spinning the same, while the torpedo is in said tube, substantially as described.

8. In combination with the other parts of a self-propelled and self-steering torpedo, a gyroscope mounted within the body and independent of the propelling means thereof, a launching tube, and means for spinning said gyroscope from outside of said tube independently of movement of said propelling means, substantially as described.

9. In combination with a torpedo body, a gyroscope, and associated automatic steering means within the same; a launching tube, internal spinning connections within the torpedo body, and an external spinning device adapted to make temporary operative engagement with said internal spinning connections from outside of said tube, substantially as described.

10. In combination with a torpedo body, a gyroscope, and associated automatic steering means within the same; a launching tube, internal spinning connections within the torpedo body adapted to make temporary operative engagement with the gyroscope-wheel, and an external spinning device adapted to make temporary operative engagement with said internal spinning connections from outside of said tube, substantially as described.

11. In combination with a torpedo body, a gyroscope, and associated automatic steering means within the same; a launching tube, a reciprocating revoluble spinning shaft on the torpedo body, an external reciprocating spinning shaft, and means for producing engagement between said shafts at will, substantially as described.

12. In combination with a torpedo, a gyroscope, and associated automatic steering means within the same; a launching tube, internal spinning connections within the torpedo body, an external spinning device adapted to make temporary operative engagement with said internal spinning connections, means tending to disengage said spinning connections from said spinning device and a lock for preventing such dis-engagement, substantially as described.

13. In combination with a torpedo body, a gyroscope, and associated automatic steering means within the same; a launching tube, means for spinning the gyroscope-wheel from without the tube, and means for simultaneously firing the torpedo and releasing the gyroscope wheel from said spinning means, substantially as described.

14. In combination with a torpedo body, a gyroscope, and associated automatic steering means within the same; a launching tube, internal spinning connections within the torpedo body, an external spinning device adapted to make temporary operative engagement with said internal spinning connections, means tending to disengage said spinning connections from said spinning device, a lock for preventing such dis-engagement, and means for simultaneously firing the torpedo and releasing said dis-engaging means from the restraint of said lock, substantially as described.

15. In combination with a self-propelling and steering torpedo having a controlling gyroscope and internal spinning connections therefor; a launching tube, external spinning connections adapted to engage said internal spinning connections, means tending to disengage said external and internal spinning connections, a lock for preventing such disengagement, a spinning motor connected with said external spinning connections, a firing means associated with said tube, and means for releasing said lock adapted to operate on appropriate movement of said firing means, substantially as described.

16. In combination with a self-propelling and steering torpedo having a controlling gyroscope and internal spinning connections therefor, a launching tube, an external spinning connection, means tending to separate said external and internal connections; a lock therefor, a tripping bar extending along the side of said tube, means tending to move said bar to trip said lock, and a means normally securing said bar to prevent tripping movement thereof, substantially as described.

17. In a device of the class described, a launching tube, a spinning motor, a rotatable sleeve geared thereto, an external spinning shaft adapted to enter said tube and to slide within and turn with said sleeve, means tending to withdraw said shaft from the tube, and a lock normally opposing said withdrawing means, substantially as described.

18. In a device of the class described and in combination with internal spinning connections in a torpedo; a socket on the shell of the torpedo, a spinning plug sliding in said socket, means thereon for engaging said internal spinning connections, and means also on said plug whereby the same may be rotated from outside the torpedo, substantially as described.

19. In a device of the class described and in combination with internal spinning connections in a torpedo, a socket on the shell of a torpedo, a spinning plug sliding in said socket, means tending to push said plug outward, and a threaded head on said plug adapted to screw into a portion of said socket for securing the plug against the tendency of said pushing means, substantially as described.

20. In a device of the class described and in combination with internal spinning connections in a torpedo; a socket on the shell of the torpedo, a spinning plug sliding in said socket, means thereon for engaging said internal spinning connections, means tending to move said plug outward, and a temporary locking means within the torpedo for resisting said moving means, substantially as described.

21. In a device of the class described and in combination with a longitudinally shiftable spinning connection within the torpedo body, a socket on the shell of the torpedo having an external opening and a valve seat near said opening and a plug on said shiftable spinning connection, means on said plug for engaging said connection, and a head on said plug adapted to fit said seat, substantially as described.

22. In spinning means for the gyroscope-wheel of a torpedo, a socket on the torpedo shell, a rotatable hollow reciprocating spinning plug, a spring pressed plunger within the same, a rotatably reciprocating internal spinning shaft abutting on and engaging with the end of said plug, and a pin on the end of said shaft adapted to enter the hollow of said plug and abut upon the plunger therein, substantially as described.

23. An internal spinning connection for the steering gyroscope-wheel of a torpedo comprising a gear on the gyroscope wheel-shaft, a reciprocating shaft carrying a second gear, means for moving said latter shaft to bring said two gears into and out of mesh, means for rotating said reciprocating shaft, and pneumatic means for separating said gears by causing reciprocating movement of said shaft, substantially as described.

24. An internal spinning connection for the steering gyroscope-wheel of a torpedo comprising a gear on the gyroscope-wheel shaft, a centering device, a reciprocating shaft carrying a gear, means for moving said centering device and said latter shaft to bring said two gears into and out of mesh, and means for rotating said reciprocating shaft, substantially as described.

25. An internal spinning connection for the steering gyroscope-wheel of a torpedo comprising a gear on the gyroscope-wheel shaft, a reciprocating shaft carrying a gear and a rack, a pinion meshing with said rack, and means for rotating said pinion adapted to be operated from outside of the torpedo, substantially as described.

26. In combination with the steering gyroscope of a torpedo, a reciprocating spinning shaft therefor, means for moving the said shaft longitudinally to cause operative engagement with the gyroscope-wheel, means tending to disengage the spinning shaft and wheel, and means within the torpedo body for preserving engagement between said wheel and shaft, substantially as described.

27. In combination with the steering gyroscope of a torpedo, a reciprocating spinning shaft therefor, means for moving said shaft longitudinally to cause operative engagement with the gyroscope-wheel, means tending to disengage the spinning shaft and wheel, a revoluble spinning plug abutting against said spinning shaft and having a threaded portion, and a socket for said plug having a thread for engagement with the threaded portion of said plug, substantially as described.

28. In combination with the steering gyroscope of a torpedo, a reciprocating spinning shaft therefor, means for moving said shaft longitudinally to cause operative engagement with the gyroscope-wheel, means tending to disengage the spinning shaft and wheel, a revoluble spinning plug abutting against said spinning shaft, and having a threaded portion, and a socket for said plug having a thread for engagement with the threaded portion of the said plug, said socket having an opening to the exterior of the torpedo body adapted to be closed by said plug when in one position, substantially as described.

29. In a device of the class described and in combination with an internal spinning connection in a torpedo; a socket on the shell of the torpedo, a spinning plug sliding in said socket, means thereon for engaging said internal spinning connection, means tending to move said plug outward, and temporary locking means for said plug adapted to become automatically unlocked by rotation of said plug, substantially as described.

30. Automatic steering mechanism for self-propelling torpedoes comprising in combination a rudder, a fluid pressure engine connected to said rudder, a gyroscope, a primary valve controlled thereby, and a secondary valve governing said engine and governed by said primary valve, said secondary valve being arranged to direct the engine exhaust through passages independent of said primary valve, substantially as described.

31. Automatic steering mechanism for self-propelling torpedoes comprising in combination a rudder, a pneumatic engine connected to said rudder for moving it, a gyroscope, a governing valve for said engine adapted to be moved into various positions as a whole with relation to said gyroscope, and means connected with said gyroscope for operating said governing valve when the latter is in a pre-determined position relative to said gyroscope, substantially as described.

32. In combination with the pneumatic steering mechanism of a torpedo and a controlling gyroscope therefor; a governing valve for said steering mechanism carried independently of the gyroscope and adapted to be moved as a whole into various positions with relation thereto, and means connected to said gyroscope for operating said governing valve when the latter is in a pre-determined position relative to said gyroscope, substantially as described.

33. In combination with the pneumatic steering mechanism of a torpedo and a controlling gyroscope therefor; a governing valve for said steering mechanism mounted so as to be capable of rotation around the axis of one of the gyroscope gimbals, means mounted on said gimbal for operating said governing valve when the latter is in a pre-determined position relative to said gyroscope, and means extending to the exterior of the torpedo shell for rotating said governing valve around its support, substantially as described.

34. In combination with the pneumatic steering mechanism of a torpedo and a controlling gyroscope therefor; a governing valve for said steering mechanism mounted so as to be rotatable around the axis of one of the gyroscope gimbals, a worm-wheel attached to said governing valve, a shaft extending inward from outside of a torpedo shell carrying a worm permanently engaging said worm-wheel, and means connected to said gyroscope for operating said governing valve when in a predetermined position relative thereto, substantially as described.

35. In combination with the steering mechanism of a torpedo and a controlling gyroscope therefor; a rotatable mounting centered on the axis of movement of one of the gyroscope gimbals, a governing valve for the steering mechanism carried by said mounting, means carried by said gimbal for operating said valve when in a predetermined position, and means for rotating said mounting and valve together, substantially as described.

36. In combination with the steering mechanism of a torpedo and a controlling gyroscope therefor; a rotatable mounting centered on the axis of movement of one of the gyroscope gimbals, a governing valve for the steering mechanism carried by said mounting, a toothed disk on said gimbal for operating said valve when in a predetermined position, and means for rotating said mounting and valve together, substantially as described.

37. In combination with the steering mechanism of a torpedo and a controlling gyroscope therefor; a rotatable mounting centered on the axis of movement of one of the gyroscope gimbals, a governing valve for the steering mechanism carried by said mounting, a disk on said gimbal carrying a radially adjustable tooth adapted to operate said valve, and means for rotating said mounting and valve together, substantially as described.

38. In combination with a steering mechanism of a torpedo and a controlling gyroscope therefor; a rotatable mounting centered on the axis of movement of one of the gyroscope gimbals, a governing valve for the steering mechanism carried by said mounting and having an operating arm carrying two curved wings separated by a notch, a disk carried by said gimbal fitting into the curve of one or the other of said wings according to the position of the valve, a tooth on said disk for swinging said arm to operate said valve, and means for rotating said mounting and valve, substantially as described.

39. A controlling means for the steering mechanism of a torpedo comprising in combination a gyroscope, a rotatable support centered on the axis of one of the gimbals of said gyroscope, a mounting therefor having a plurality of grooves on its surface, an arm on said support having a plurality of passages registering with said grooves, a valve on the said arm adapted to govern the passage of fluid through said passages, means carried by the gyroscope for controlling said valve, and means for supplying fluid under pressure to said mounting and to said valve, substantially as described.

40. A controlling means for a steering mechanism in a torpedo comprising in combination a gyroscope, a rotatable valve adapted to be swung around the axis of one of the gyroscope gimbals, means on said gyroscope for holding said valve in one or the other position when it swings as aforesaid, and means also on said gyroscope for shifting said valve as it reaches a predetermined position relative to the gyroscope, substantially as described.

41. In a self-propelling and self-steering torpedo, a gyroscope chamber, an exterior door therefor, a gyroscope in said chamber, a movable mounting for said gyroscope in the chamber wall and an opening for inserting a tool in the torpedo shell placed near said mounting and provided with a water-tight closure, substantially as described.

42. A closure for an opening in a torpedo shell comprising in combination an appropriately threaded seating ring, a door adapted to fit thereon, a joining ring having a right and left thread secured into said door and seating ring, and means for rotating the joining ring from outside the torpedo shell when the door is nearly seated, substantially as described.

43. A closure for an opening in a torpedo shell comprising in combination an appropriately threaded seating ring, a door adapted to fit thereon, a joining ring having a right and left thread secured into said door and seating ring, an internally toothed gear on said joining ring, a pinion mounted in said door and meshing with said internally toothed gear, and means for rotating said pinion from outside of the door, substantially as described.

44. In an automatically steered torpedo, and in combination with the gyroscope and angle fire attachment thereof, an indicator for the angle fire adjustment apparatus comprising a cylinder marked from zero upward along one side of its periphery in correspondence with one direction of movement of said angle fire adjustment apparatus and similarly marked in the opposite direction on the other edge of the cylinder in correspondence with opposite movement of said angle fire adjustment apparatus and operating connections between said indicator and said angle fire attachment, substantially as described.

HAROLD W. SHONNARD.

Witnesses:
ROBERT W. STROUT,
HARRY A. VIETS.